(12) United States Patent
Jeuffe

(10) Patent No.: US 7,568,258 B2
(45) Date of Patent: Aug. 4, 2009

(54) WINDSHIELD WIPING STRIP AND A WIPER BLADE PROVIDED WITH SAID WIPING STRIP

(75) Inventor: Gerard Jeuffe, Feucherolles (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 0 days.

(21) Appl. No.: 11/910,861

(22) PCT Filed: Mar. 17, 2006

(86) PCT No.: PCT/FR2006/050234

§ 371 (c)(1),
(2), (4) Date: Oct. 5, 2007

(87) PCT Pub. No.: WO2006/106249

PCT Pub. Date: Oct. 12, 2006

(65) Prior Publication Data

US 2008/0189897 A1    Aug. 14, 2008

(30) Foreign Application Priority Data

Apr. 8, 2005    (FR)    ..................... 0503538

(51) Int. Cl.
*B60S 1/38*    (2006.01)
(52) U.S. Cl. .............................. 15/250.48; 15/250.361
(58) Field of Classification Search ............. 15/250.48, 15/250.361, 250.41, 245
See application file for complete search history.

(56) References Cited

U.S. PATENT DOCUMENTS

| 2,051,668 | A | * | 8/1936 | Zaiger ........................ 15/250.4 |
| 2,063,375 | A |   | 12/1936 | Harvey et al. |
| 3,636,583 | A |   | 1/1972 | Rosen |
| 4,123,817 | A | * | 11/1978 | Hartery ................... 15/250.04 |
| 4,524,481 | A |   | 6/1985 | Koomen |

OTHER PUBLICATIONS

International Search Report mailed Jul. 28, 2006 in PCT/FR2006/050234.

* cited by examiner

*Primary Examiner*—Gary K Graham
(74) *Attorney, Agent, or Firm*—Nicolas E. Seckel

(57) ABSTRACT

The inventive wiping strip comprises a heel (3), a wiping lip (5), a flexible joint part (11) joining the lip to the heel, wherein said lip (5) extends on an axial median plane (P), the joint part (11) comprises two flexible symmetrically curved walls (21) and defines a recess (23) between said joint part and heel, and an abutment (31) which is protruded from the heel into the recess, symmetrically shaped and is used for limiting the bending stresses of the joint part (11). The abutment (31) is provided with a flexible core (33) substantially extending on the symmetry plane (9). A wiper blade provided with said windshield wiping strip is also disclosed.

12 Claims, 2 Drawing Sheets ately trapezoid profile, symmetrical with respect to the plane P, in which two longitudinal grooves 13 are symmetrically formed. The longitudinal direction means the main direction of the wiping strip, which corresponds to the direction of a line along which the lip 5 is supported on the windshield surface 10.

WINDSHIELD WIPING STRIP AND A WIPER BLADE PROVIDED WITH SAID WIPING STRIP

BACKGROUND ART

The present invention concerns a wiping strip for a motor vehicle windshield wiper, comprising:
a heel for fixing to the arm of a windshield wiper,
a wiping lip,
a flexible joint part connecting the lip to the heel, the lip extending according to a median axial plane of the wiping strip, and the joint part comprising two flexible curved walls, substantially symmetrical in relation to one another with respect to this plane, and defining a recess between them and the heel, and
an abutment protruding from the heel into the recess, symmetrical with respect to said plane, and intended to be contacted by the walls and thus to limit the bending deformation of the joint part.

In known wiping strips of this type, the joint part can be subjected to important deformations, during operation, in particular when the windshield has defects or surface irregularities.

In such known wiping strips, the abutment is essentially rigid, so that it does not undergo any substantial deformation when the flexible walls of the joint part come to press on it.

Thus, for important deformations of the joint part, shocks and frictions occur between the latter and the abutment, which generate noise and wiping defects. This noise can reach a relatively high level and constitute a nuisance, even though the wiping pressure applied to the wiping strip to improve its effectiveness is generally high.

SUMMARY OF THE INVENTION

An objective of the invention is to remedy this drawback, and, to this effect, an object of the invention is a wiping strip of the type mentioned above, in which the abutment has a flexible core extending substantially on the symmetry plane.

According to other, optional, characteristics, of the invention:
said abutment comprises two abutment parts protruding laterally from the core, intended to be contacted by the flexible walls;
the abutment parts are formed from the free side of the core;
said abutment has a T-shaped profile;
each of said flexible walls has a thickness that varies between the heel and the lip; and
the wiping strip is formed of a molded or extruded part.

In addition, an object of the invention is a wiper blade for a motor vehicle equipped with a wiping strip as described above.

BRIEF DESCRIPTION OF THE DRAWINGS

A particular embodiment of the invention will now be described in more details in reference to the annexed drawings in which.

DETAILED DESCRIPTION OF PARTICULAR EMBODIMENTS

Figure 1:
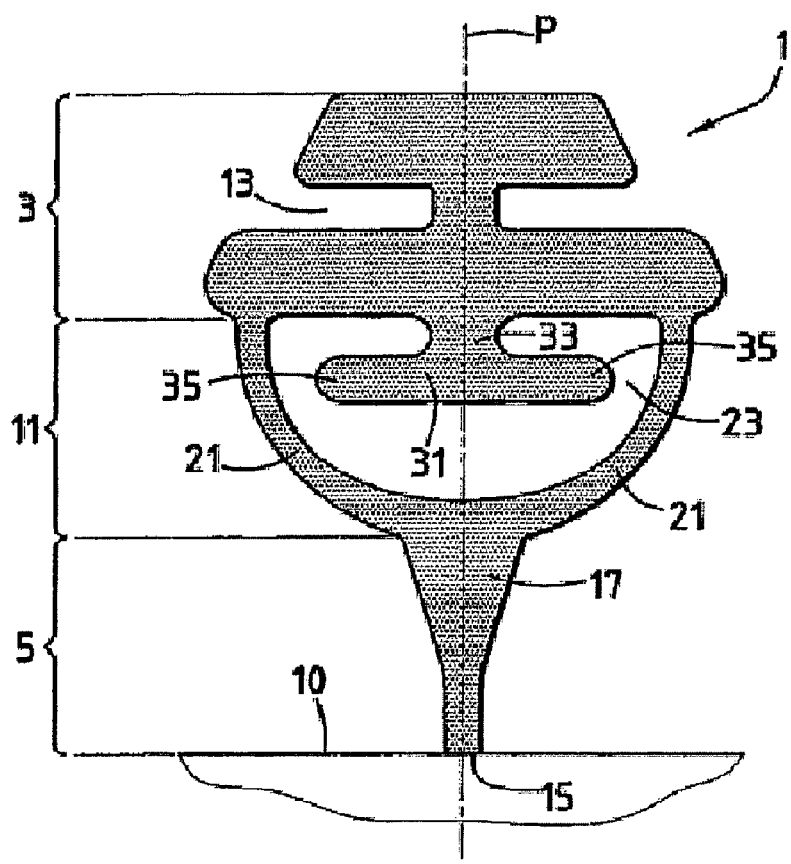
FIG. 1 is a transverse cross-section view of a wiping strip according to the invention, supported on the surface of a motor vehicle windshield, the wiping strip being at rest.

FIG. 1 shows a wiping strip for a motor vehicle windshield wiper blade, of a type conform to a particular embodiment of the present invention, the wiping strip 1 being at rest, in a non-deformed state.

The wiping strip 1 is elongated along a main direction, and has been represented by a standard transverse cross-section. The wiping strip 1 is symmetrical with respect to a median axial plane P.

The wiping strip 1 is made, in the example shown, as a single part molded in an elastomer material, such as, for example, rubber.

The wiping strip 1 has a heel 3 for fixing to the arm of a windshield wiper blade that has not been shown, and a wiping lip 5 intended to be supported on the outer surface 10 of a vehicle windshield.

The wiping strip 1 further comprises a flexible joint part 11, connecting the lip 5 to the heel 3, so that the lip 5 can take various inclinations with respect to the windshield surface 10 during operation of the wiper.

The heel 3 is generally formed of a block having a generally trapezoid profile, symmetrical with respect to the plane P, in which two longitudinal grooves 13 are symmetrically formed. The longitudinal direction means the main direction of the wiping strip, which corresponds to the direction of a line along which the lip 5 is supported on the windshield surface 10.

The grooves 13 are intended to receive corresponding rails of a wiper blade arm inserted therein, to ensure the fixation of the wiping strip to the arm.

The lip 5, in the example shown, has a profile that tapers toward its free end 15, this profile having a base of larger thickness 17 on the side of the joint part 11.

The lip 5 extends substantially on the symmetry plane P of the wiping strip.

The joint part 11 is essentially formed of two flexible walls 21, symmetrical in relation to one another with respect to the plane P. These walls 21 extend from the heel 3 toward the larger thickness base 17 of the lip 5, according to a curved profile whose concavity is oriented toward the heel 3 and the symmetry plane P.

At rest, the profile of each of the curved walls 21 is in the general shape of a portion of a circle, which gives to the arrangement of the two walls 21 a general shape of a semi-circular arch.

The walls 21 define a recess 23 between them and the heel 3.

Each of the walls 21 has a thickness that varies, from the heel 3 toward the lip 5, first in a decreasing manner, then in an increasing manner. This arrangement makes it possible to improve the behavior of the joint part 11 with respect to the repartition of bending stresses, when the wiping strip is in a normal operation phase.

However, in a variant embodiment (not shown), this thickness could be constant.

Further, the wiping strip 1 has an abutment 31 protruding from the heel 3 into the recess 23.

This abutment 31 is intended to limit the deformations of the joint part 11 in flexion, during operation of the wiping strip.

The abutment 31 makes it possible to limit the acoustic resonances transmitted to the windshield, and to reduce the operating noise inside the vehicle.

At rest, the abutment 31 is not in contact with the walls 21. Further, it is adapted to be contacted by the walls 21 only during deformations of these walls beyond the normal deformation level. This will be seen and explained below.

In the example shown, the abutment 31 has a T-shaped profile.

That is, the abutment 31 has a core 33 extending substantially on the plane P, from the heel 3, and two symmetrical abutment portions 35 protruding transversally from the core 33. These abutment portions 35 are intended to be contacted by the flexible walls 21.

The core 33 is flexible in that its minimum thickness is adapted to bend in the case of an abnormally high force. Preferably, the minimum thickness of the core 33 is comprised between 1.8 and 2.2 times the minimum thickness of the wall 21.

Similarly, the thickness of the lateral portions 35 is intended to be capable of bending with the walls 21 when the walls come to be supported on the abutment. The standard thickness of the two abutment portions 35 is equal to at least the minimum thickness of the core 33.

Figure 2:
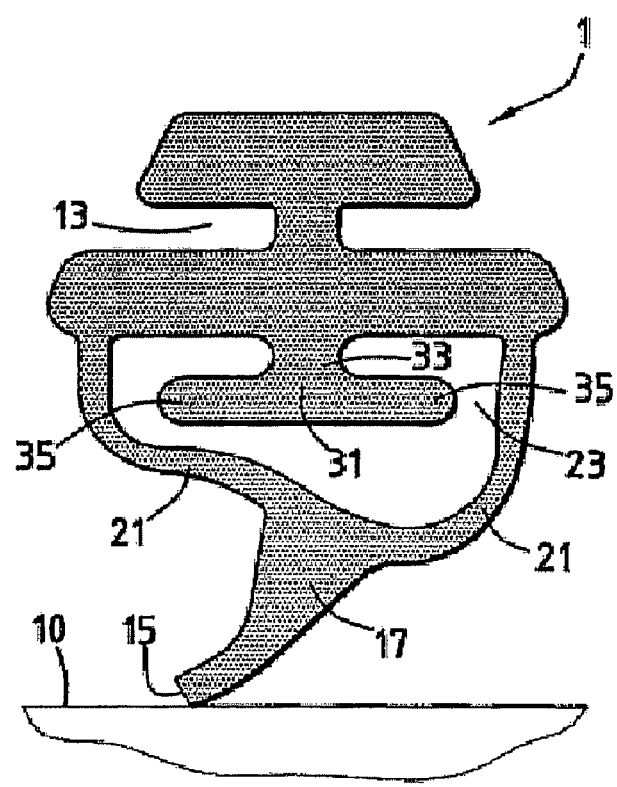
FIG. 2 is a similar view illustrating the wiping strip of FIG. 1 during normal operation.

FIG. 2 shows the profile of the wiping strip of FIG. 1, when the wiping strip is in operation. In the position illustrated on FIG. 2, the wiping strip is moving from left to right (according to the orientation of the Figure) on the windshield surface 10.

In such a normal operation phase, the walls 21 of the joint part 11 undergo a bending deformation without coming in contact with the abutment 31.

The joint part 11 ensures an optimum orientation of the lip 5 with respect to the windshield, and makes it possible to maintain a substantially uniform contact pressure of the lip on the windshield over the whole course of the wiping strip.

Figure 3:
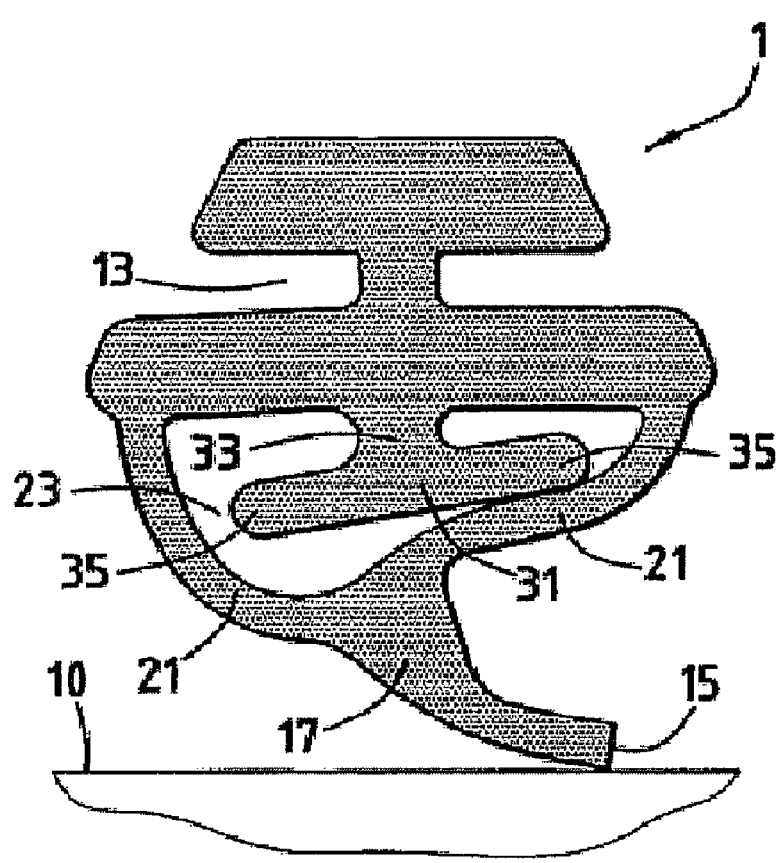
FIG. 3 is a view similar to FIG. 2, illustrating a very high level of deformation of the wiping strip, when the wiping pressure becomes abnormally high.

As can be seen on FIG. 3, when the wiping strip 1 is subjected to abnormally high pressure during operation on the windshield, the walls 21 undergo a more important deformation, and one of them comes to be supported on the abutment 31, in the area of the corresponding abutment portion 35.

The flexibility of the abutment 31, which translates into a flexion of the core 33 and of the abutment portion 35, makes it possible to accompany the flexion of the wall 21, thus limiting and dampening the shock of the wall against the abutment.

This dampening effect reduces in a highly noticeable way the noise produced by the wiping strip during severe operation phases, caused by excessive contact pressures.

In addition, stresses on the walls 21 are thus reduced, which contributes to increasing substantially the resistance of the wiping strip.

In this way, the invention provides a solution to the problem of acoustic nuisances generated by wiping strips, which problem is currently magnified by the use of windshield having more and more complex shapes, while increasing the longevity of wiping strips.

The invention claimed is:

1. Wiping strip for a motor vehicle windshield wiper, comprising:
    a heel for fixing to the arm of a windshield wiper,
    a wiping lip,
    a flexible joint part connecting the lip to the heel, the lip extending according to a median axial plane of the wiping strip, and the joint part comprising two flexible curved walls, substantially symmetrical in relation to one another with respect to this plane, and defining a recess between them and the heel, and
    an abutment protruding from the heel into the recess, symmetrical with respect to said plane, and intended to be contacted by the walls, and thus, to limit the bending deformation of the joint part,
    wherein said abutment has a T shaped profile including a flexible core extending substantially on said median axial plane and two abutment portions protruding laterally from a free end of the core to a respective free end thereof, toward the respective walls, each of said abutment portions having a first surface facing the heel and a second surface opposed to the heel, each abutment portion being free from contact with the curved walls in a non-deformed state of the wiper strip,
    said first and second surfaces being substantially parallel to each other from an end of each abutment portion connected to the core to the respective free end of each abutment portion, so that the abutment portions can flex with the walls when the walls come to be supported on the abutment by engagement therewith during deformation.

2. Wiping strip according to claim 1, wherein each of said flexible walls has a thickness that varies between the heel and the lip.

3. Wiping strip according to claim 2, which is formed of a molded or extruded part.

4. Wiper blade for a motor vehicle, which is equipped with a wiping strip according to claim 2.

5. Wiping strip according to claim 1, which is formed of a molded or extruded part.

6. Wiper blade for a motor vehicle, which is equipped with a wiping strip according to claim 5.

7. Wiper blade for a motor vehicle, which is equipped with a wiping strip according to claim 1.

8. Wiping strip according to claim 1, wherein a minimum thickness of the core is from 1.8 to 2.2 times a minimum thickness of the walls.

9. Wiping strip according to claim 8, wherein the thickness of the abutment portions is equal or above the minimum thickness of the core.

10. Wiping strip according to claim 1, wherein the thickness of the abutment portions is equal or above a minimum thickness of the core.

11. Wiping strip according to claim 1, wherein the abutment portions extend on a plane substantially perpendicular to the median axial plane in a rest position of the abutment.

12. Wiping strip according to claim 11, wherein the first and second surfaces are substantially perpendicular to the median axial plane in a rest position of the abutment.

* * * * *